United States Patent
Parison et al.

(10) Patent No.: US 6,364,078 B1
(45) Date of Patent: Apr. 2, 2002

(54) WHEEL DAMPING

(75) Inventors: Jams A. Parison, Fitzwilliam, NH (US); Lawrence D. Knox, Milford, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 09/140,937

(22) Filed: Aug. 27, 1998

(51) Int. Cl.⁷ .............................. E16F 7/10; B60B 37/100
(52) U.S. Cl. ...................... 188/380; 301/6.91; 301/136
(58) Field of Search ........................... 267/70, 71, 286; 188/283, 283.1, 312, 316, 317, 380; 301/6.91

(56) References Cited

U.S. PATENT DOCUMENTS

| 2,854,100 A | | 9/1958 | Bowser et al. |
|---|---|---|---|
| 2,955,841 A | | 10/1960 | Faiver et al. |
| 4,442,925 A | * | 4/1984 | Fukushima et al. ...... 188/283.1 |
| 4,981,309 A | * | 1/1991 | Froeschle et al. ........... 280/707 |
| 4,991,698 A | * | 2/1991 | Hanson ...................... 301/6.91 |
| 5,829,556 A | * | 11/1998 | Domange ................... 188/312 |

FOREIGN PATENT DOCUMENTS

| DE | 11 17 417 | 11/1961 |
|---|---|---|
| DE | 40 04 333 | 9/1990 |

* cited by examiner

Primary Examiner—Christopher P. Schwartz
(74) Attorney, Agent, or Firm—Fish & Richardson P.C.

(57) ABSTRACT

A wheel assembly for a vehicle. The wheel assembly includes a brake assembly which defines the outer radius of an annular region about the axis of the wheel assembly and a damping mass assembly for damping vertical vibrations of the wheel assembly, located within the annular region.

18 Claims, 5 Drawing Sheets

WHEEL DAMPING

The invention relates to automobile suspensions and more particularly to assemblies for damping vertical vibrations of wheel assemblies.

For background, reference is made to U.S. Pat. No. 4,991,698.

It is an important object of the invention to provide an improved automobile suspension.

According to the invention, a wheel assembly for a vehicle includes a wheel axis, a brake assembly which defines the outer radius of an annular region about the axis, and a damping mass assembly located within the annular region for damping vertical vibrations of the wheel assembly.

In another aspect of the invention a wheel assembly for vehicle includes a wheel axis, an annular region about he axis, a brake assembly in the annular region, and a damping mass assembly located within the annular region for damping vertical vibrations of the wheel assembly. The damping mass assembly includes a damping mass, and a damping mass vertical positioning assembly for positioning the damping mass. The vertical positioning assembly for positioning the damping mass. The vertical positioning assembly includes a shaft, for causing the vertical vibrations of the wheel assembly to be translated to vertical, non-radial movement of the damping mass, and a first spring, for opposing in a first direction the vertical motion of the damping mass.

In a specific form, the damping mass assembly is in a nonrotating section of the wheel. There is a first surface mechanically coupled to the nonrotating section of the wheel, a second surface mechanically coupled to the damping mass, wherein a first spring exerts force by urging the first surface away from the second surface. A third surface is mechanically coupled to the nonrotating section of the wheel. A fourth surface is mechanically coupled to the damping mass wherein a second spring exerts force by urging the third surface away from the fourth surface. The damping mass positioning assembly is constructed and arranged so that a condition in which the first spring contacts both the first surface and the second surface and a condition in which the second spring contacts both the third surface and the fourth surface are mutually exclusive.

Other features, objects, and advantages will become apparent from the following detailed description, which refers to the following drawings in which.

Figure 1:
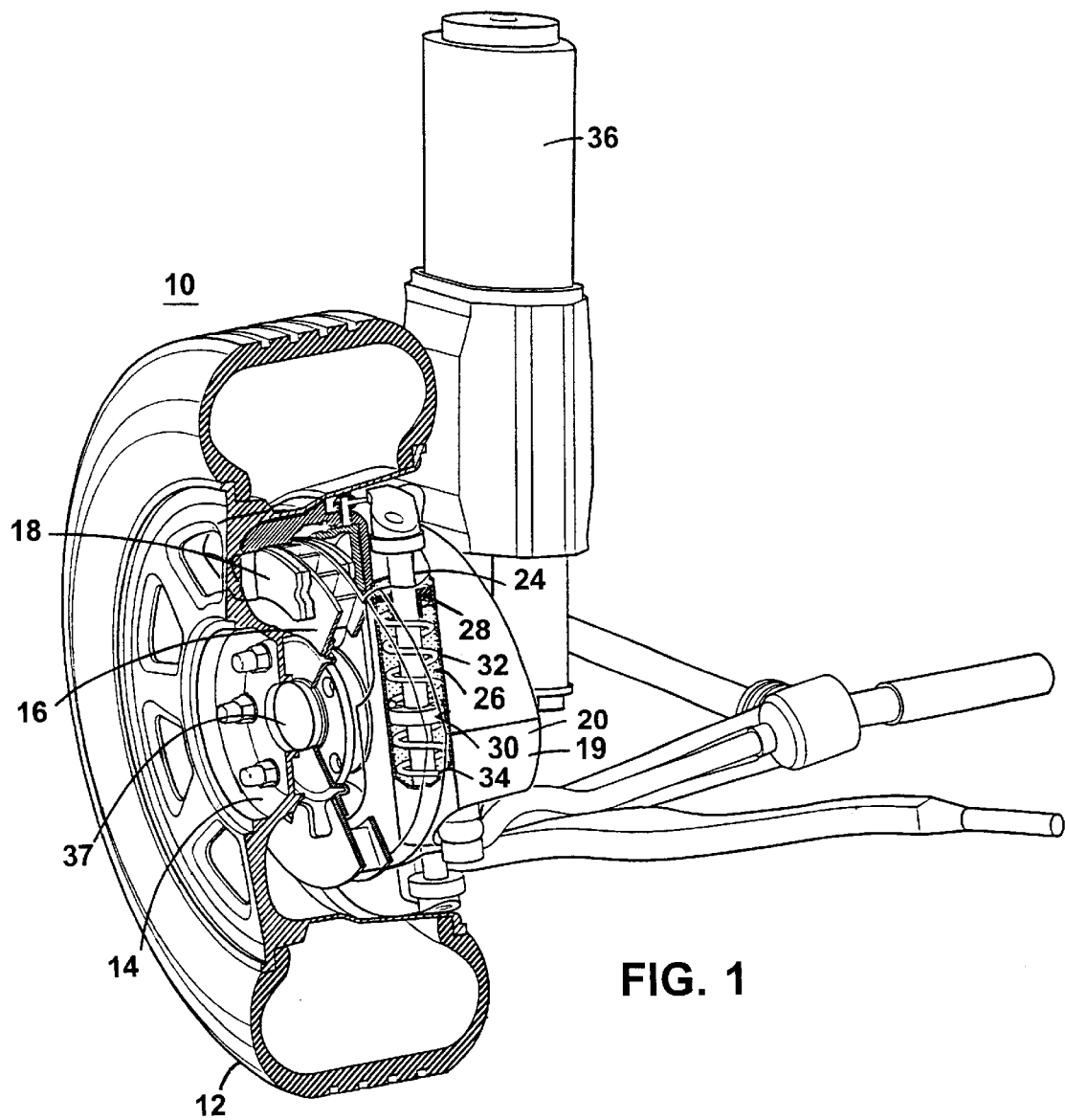
FIG. 1 is a partially cutaway view of a wheel assembly and suspension system according to the invention.

With reference now to the drawings and more particularly to FIG. 1, there is shown an active suspension assembly according to the invention. Wheel assembly 10 includes an axis defined by axle 37, tire 12, hub 14, and brake elements including brake disk 18 and brake pad 16. Positioned in an annular region which has an outer radius generally defined by the outer extent of brake elements (brake pad 18 and brake disk 16), is mass damper assembly 19. Mass damper assembly 19 includes damping mass 20 and vertical positioning assembly 24 which includes central shaft 28 disposed in a hollow cylinder 26 in the damping mass 20, orifice plate 30, and vertical positioning springs 32 and 34. Actuator 36 couples wheel assembly 10 to the body subframe, both shown in this view. In this embodiment, mass damper assembly 19 includes a second vertical positioning assembly, not shown in this view.

Elements of the mass damper assembly damp vertical vibration of the wheel assembly, and will be described in more detail below. Actuator 36, which may be a linear actuator such as described in U.S. Pat. No. 4,981,309, acts to oppose upward and downward motion of the wheel assembly, thereby isolating the body subframe and therefore the passenger compartment of the automobile from vertical motion caused by unevenness in the road. Additionally, actuator 36 may coact with similar actuators on other wheels to control the attitude of the passenger compartment.

Figure 2:
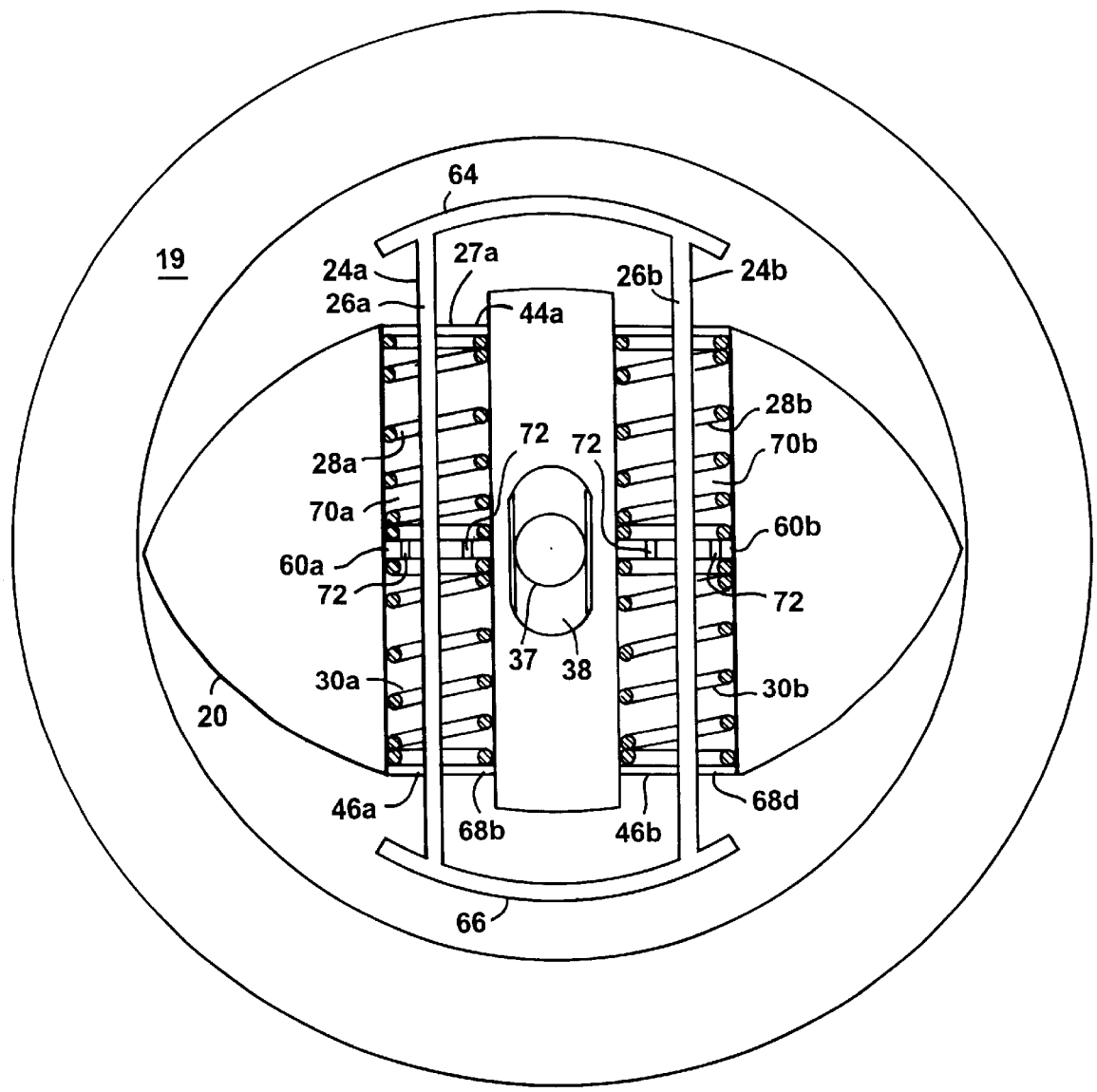
FIG. 2 is a cross sectional view of damping mass assembly according to the invention.

Referring now to FIG. 2, there is shown a diagrammatic view, partially in section of the mass damper assembly 19. Mass damper assembly 19 includes a damping mass 20 and two vertical positioning assemblies 24a, 24b, including central shafts 26a and 26b, vertical positioning springs 28a, 30a, 28b and 30b, orifice plates 60a and 60b, and fluid filled cylinders 70a and 70b. Slot 38 extends through damping mass 20 in a horizontal direction along an axis parallel to the axis of rotation of the tire to allow axle 14 to move vertically relative to damping mass 20. Hollow cylinders 27a, 27b extend vertically through damping mass 20.

Shafts 26a, 26b, are rigidly attached at each end to the non-rotating portion of the wheel. Shafts 26a, 26b extend vertically through cylinders 27a, 27b. Orifice plates 60a, 60b are rigidly attached to the shaft at a position approximately vertically centered in the damping mass 20. Endcaps 44a, 44b, 46a, 46b are fixedly attached to damping mass 20 in the ends of cylinders 27a, 27b. Vertical positioning springs 28a, 30a, 28b and 30b are that they urge damping mass 20 toward a vertically centered position relative to axle 37. In one embodiment, the outside diameter of springs 28a, 30a, 28b, and 30b, is approximately equal to the diameter of cylinders 27a and 27b.

In one embodiment of the invention, vertical positioning springs 28a, 30a, 28b, and 30b are not attached at either end to an endplate, to an orifice plate, or to the shaft; that is, the positioning springs are "floating" are not precompressed. Additionally, elements of vertical positioning assemblies 24a, 24b may be dimensioned, constructed, and arranged so that only one of springs 28a, and 30b exert force at any one time. Furthermore, elements of vertical positioning assemblies 24a, 24b may be dimensioned, constructed, and arranged so that vertical positioning springs 28a, 30a, 28b and 30b exert force only in compression. This is advantageous because it enables vertical positioning to be performed with shorter springs. Having shorter springs enables the mass damper assembly 19 to be smaller, which in turn allows both brakes and mass damper assembly 19 to be placed in the wheel.

Sealed portions 70a and 70b of cylinders 27a, 27b between the endplates 44a, 46a and 44b, 46b may contain a fluid, such as hydraulic oil. Bearings (not shown) in the endcaps permit damping mass 54 to move up and down relative to shafts 28a, 28b, while seals retain fluid in sealed portions 70a, and 70b.

In the configuration of FIG. 2, force is exerted by a spring when the spring is compressed. If damping mass 20 moves downwards, upper spring 28a is compressed between endcap 44a and orifice plate 60a and upper spring 28b is compressed between endcap 44a and orifice 60a and upper spring 28b is compressed between endcap 44b and orifice plate 60b, causing upper springs 28a and 28b to exert upward force on endcaps 44a and 44b respectively, thereby urging damping mass 20 upwards toward a horizontally centered positioned. Similarly, an upward movement of damping mass 20 compresses springs 30a and 30b, which causes them to exert a downward force on endcaps 46a and 46b thereby urging damping mass 20 downwards toward a horizontally centered position. Since the springs are not attached at either end, springs 28a, 28b, 30a, 30b exert force in compression, but not in tension. Upper springs 28a and 28b do not oppose or augment an upward motion of damping mass 20, and lower springs 30a and 30b do not oppose or augment downward motion of damping mass 20.

The fluid cylinders 27a and 27b acts as a part of damping mass 54 and also resists vertical motion of damping mass 54 relative to shafts 28a, 28b, to dissipate vertical vibrational energy.

A vertical motion of damping mass 54 causes fluid to pass through orifices 72 in orifice plates 60a and 60b. The orifices are sized such that they resist the flow of the fluid, thereby damping the vertical motion of the damping mass. Orifice plate 60a and 60b are constructed and arranged so that they exert an appropriate resistive force at all motion velocities encountered by the mass damper assembly. The orifices will be discussed below in FIGS. 3–6c and the corresponding portions of the disclosure.

In one embodiment of the invention, a damping mass assembly has a damping mass 19 of about one half the mass of the wheel assembly mass, a spring rate of 270 lbs./inch and a tire elasticity of 1600 lbs./inch.

A damping mass assembly according to the invention is advantageous because the size of the damping mass assembly may be made small enough, using conventional materials, to permit placing brake elements in the wheel.

Figure 3:
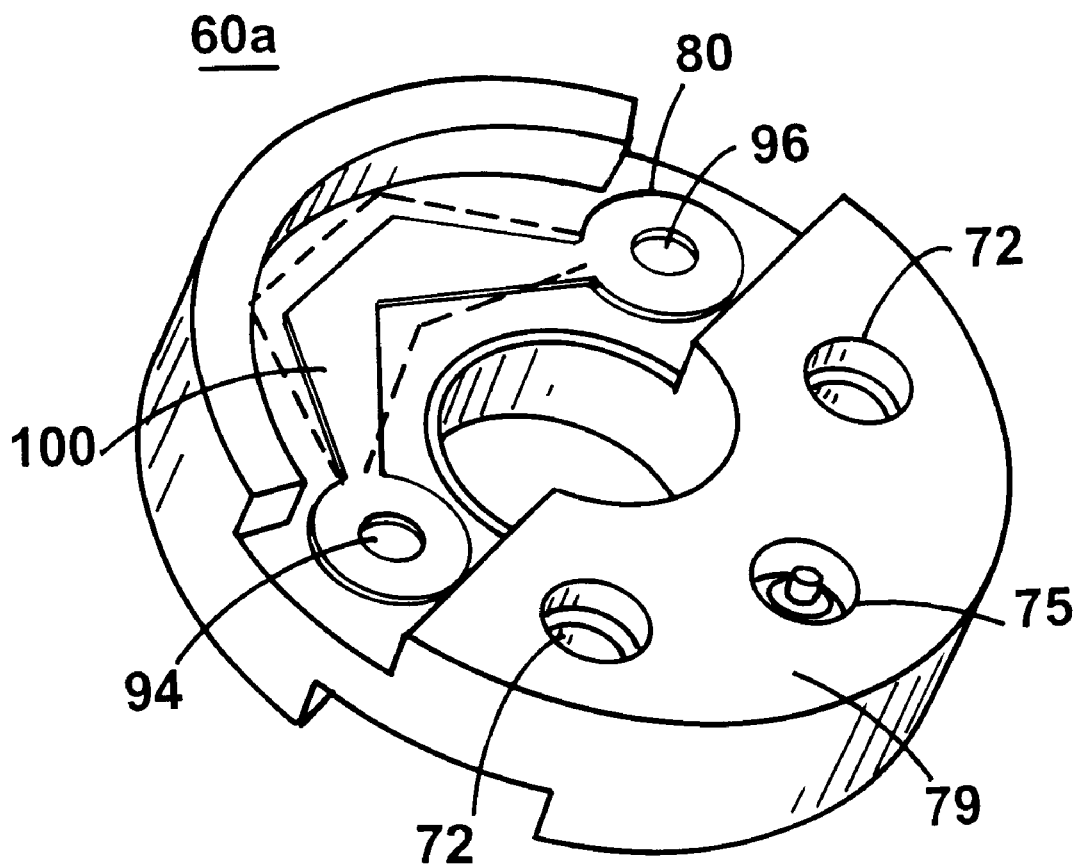
FIG. 3 is a perspective view of an orifice plate according to the invention.

Referring to FIG. 3, there is shown a more detailed perspective view of the orifice plate 60a. Orifice plate 60a has a generally round footprint to fit inside shaft 28a. Orifice plate has two generally round faces, of which one face is shown in this view. Orifices 72 allow fluid to pass through orifice plate 60a. Two additional orifices are obscured in this view by flapper 80, which is mounted on face 79. Mounting hole 75 is for mounting a flapper (obscured in this view), similar to flapper 80, on the face opposite face 79. In operation, mounting hole 75 is occupied by a screw or other fastener (not shown), so there is no fluid flow through mounting hole 75. Low velocity holes 94, 96 will be explained below. Stop 100 (shown in dotted lines) may be mounted over flapper 80 and will be described below.

Figure 4:
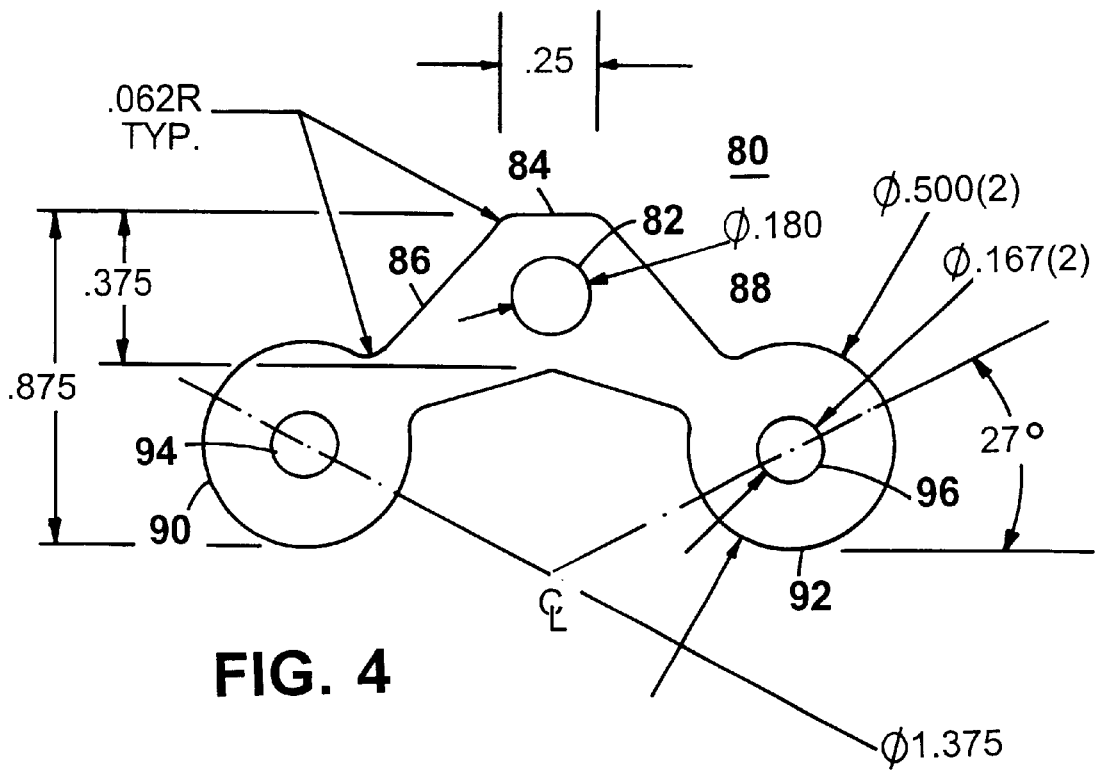
FIG. 4 is a top elevational view of a flapper

Referring to FIG. 4, there is shown a top plan view of flapper 80. In one embodiment, flapper 80 is made of 0.022 inch thick spring steel, and has a central section 84 with a mounting hole 82 which is aligned with orifice plate mounting hole 75 for accommodating a mounting screw or other fastener. Extending from central section 84 are arms 86, 88. At the distal ends of arms 86, 88 are flapping sections 90, 92, which may be circular with a radius of about 0.500 inches, slightly larger than orifices 72 of FIG. 3. Flapper 80 is positioned such that the central section is fixedly attached to the orifice plate and so that the flapping sections are free to deflect away from the orifice plate as will be further explained below. Flapper 80 may include a low velocity hole 94, 96 in each flapping section 90, 92 which may be concentric with the circular flapper section. In one embodiment, the low velocity hole has a radius of approximately 0.167 inches.

Figure 5:
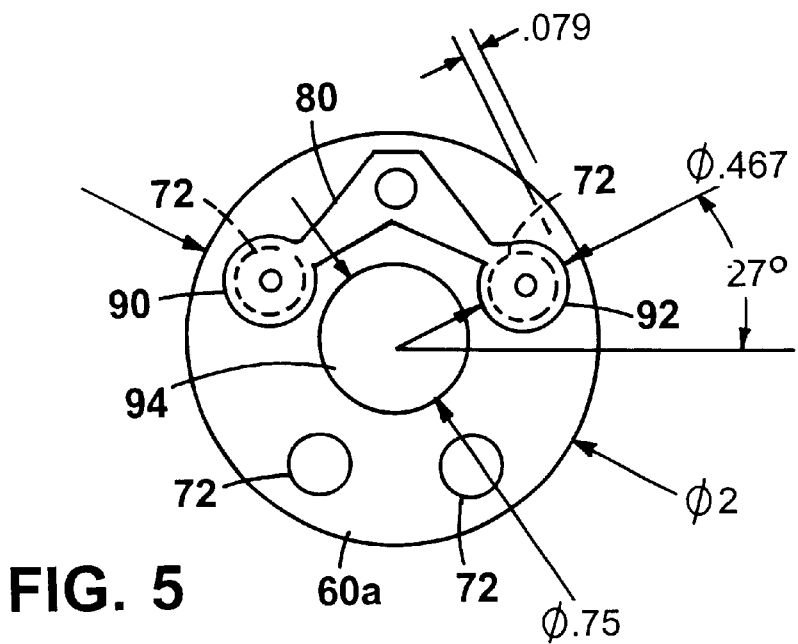
FIG. 5 is the orifice plate of FIG. 3 with the flapper of FIG. 4 in position.

Referring to FIG. 5, there is shown a top plan view of one of the orifice plates 60a with a flapper 80 in position. Central hole 94 accommodates shafts 56a or 56b. Four orifices 72 approximately 0.467 inches in diameter allow fluid to pass through orifice plate 60a. Flapper 80 is positioned such that sections 90, 92 cover orifices 72. A second flapper 80 (not shown in this view) may be positioned on the opposing face of orifice plate 60a.

Figure 6A:
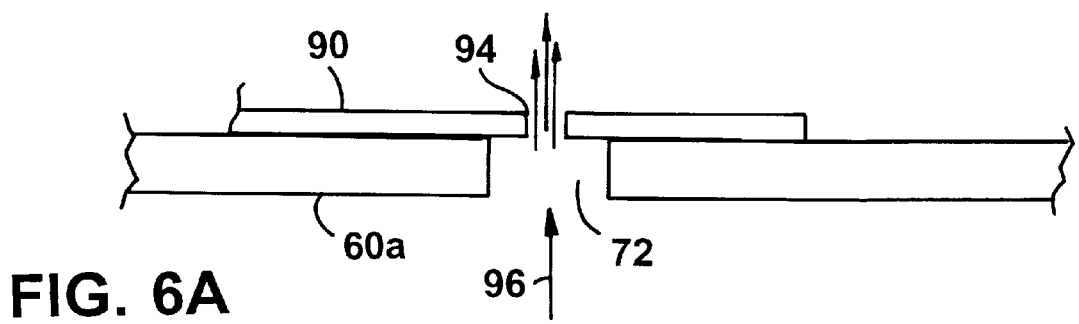
FIGS. 6a–6c are side cross sectional views of the orifice plate of FIG. 5, illustrating the operation of the flapper.
Figure 6B:
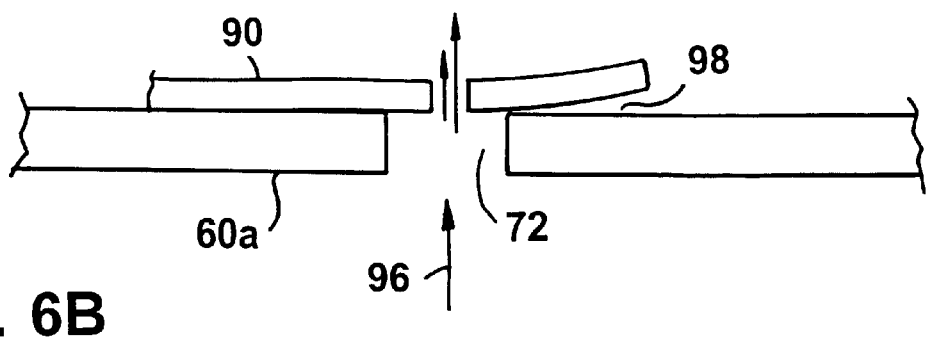
Figure 6C:
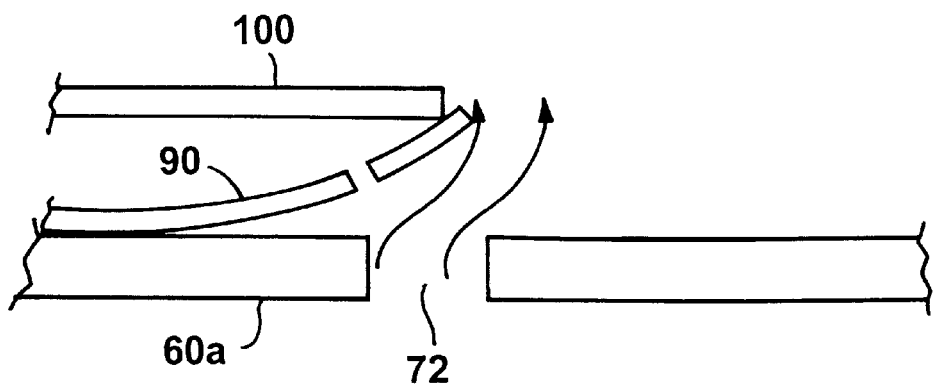

Referring to FIGS. 60–6c, there are shown partial cross sectional views of orifice plate 60a illustrating the operation of the flappers 80. During low speed fluid motion in the direction indicated by arrow 96, fluid flows through central holes 94 as shown in FIG. 6a, sot hat the effective area of each orifice 72 is the area of the hole 94. At higher speed fluid flow, force against flapping section 90 is sufficient to deflect flapping section 90 away from orifice plate upward as shown in FIG. 6b, so that the fluid flows not only through central hole 94, but also through region 98 in which the flapper has been deflected away from orifice plate 60a, thereby making the effective area of orifice 72 larger. At still higher speed fluid flow as shown in FIG. 6c, force against flapping section 90 is sufficient to deflect flapping section 90 sufficiently away from orifice plate 60a so that the flow is not restricted by flapping section 90 but rather by orifice 72 and the effective area of orifice 72 is essentially equal to the area of the orifice. Additional deflection of flapping section 90 does not increase the effective area of orifice 72, but may deform flapping section 90. To prevent excessive deflection of flapping section 90, stop 100 may be included.

Other embodiments are described in the claims.

What is claimed is:

1. A wheel assembly for a vehicle, comprising:
   a wheel axle;
   a brake assembly, defining the outer radius of an annular region about said axle;
   a damping mass assembly for damping vertical vibrations of said wheel assembly, said damping mass assembly located within said annular region.

2. A wheel assembly for a vehicle in accordance with claim 1, said damping mass assembly comprising;
   a damping mass;
   a damping mass vertical positioning assembly for positioning said damping mass, said vertical positioning assembly comprising
   a first spring, for opposing in a first direction vertical motion of said damping mass, wherein said first spring exerts force against said damping mass only in compression.

3. A wheel assembly in accordance with claim 2, further comprising a second spring, for opposing in a second direction opposite from said first direction vertical motion of said damping mass.

4. A wheel assembly in accordance with claim 3, wherein said second spring exerts force against said damping mass only in compression.

5. A wheel assembly in accordance with claim 3, wherein said first spring exerts force to oppose motion or augment motion only in said first direction.

6. A wheel assembly in accordance with claim 3, wherein said second spring exerts force to oppose motion or augment motion only in said second direction.

7. A wheel assembly in accordance with claim 3, wherein said damping mass assembly is in a nonrotating section of said wheel and further comprising
   a first surface, mechanically coupled to said nonrotating section of said wheel;
   a second surface, mechanically coupled to said damping mass, wherein said first spring exerts force by urging said first surface away from said second surface;

a third surface, mechanically coupled to said nonrotating section of said wheel;

a fourth surface, mechanically coupled to said damping mass, wherein said second spring exerts force by urging said third surface away from said fourth surface;

wherein said damping mass positioning assembly is constructed and arranged so that a condition in which said first spring contacts both said first surface and said second surface and a condition in which said second spring contacts both said third surface and said fourth surface are mutually exclusive.

8. A wheel assembly in accordance with claim 1, said damping mass assembly comprising a damping mass and a motion damper for damping vertical motion of said damping mass, said motion damper comprising:

a fluid;

a shaft in said damping mass for containing said fluid;

a piston, said piston having an orifice therethrough, said orifice having an effective size, constructed and arranged so that said vertical motion of said damping mass causes said fluid to flow through said orifice at a flow velocity;

a size adjuster for varying said effective size of said orifice responsive to said flow velocity.

9. A wheel damping assembly in accordance with claim 8, said size adjuster comprising a flap covering said orifice, constructed and arranged so that said flap is deflectable away from said orifice.

10. A wheel damping assembly in accordance with claim 9, said flap having a hole therethrough.

11. A wheel assembly for a vehicle, comprising:

a wheel axis;

an annular region about said axis;

a brake assembly in said annular region;

a damping mass assembly for damping vertical vibrations of said wheel assembly, said damping mass assembly located within said annular region, said damping mass assembly comprising a damping mass;

a damping mass vertical positioning assembly for positioning said damping mass, said vertical positioning assembly comprising a shaft, for causing said vertical vibrations of said wheel assembly to be translated to vertical, non-rotative movement of said damping mass;

a first spring, for opposing in a first direction said vertical motion of said damping mass.

12. A wheel assembly in accordance with claim 11, wherein said first spring exerts force against said damping mass in compression and wherein said first spring does not exert force against said damping mass in extension.

13. A wheel assembly in accordance with claim 12, wherein said second spring exerts force against said damping mass only in compression.

14. A wheel assembly in accordance with claim 12, wherein said first spring exerts force to oppose motion or augment motion only in said first direction.

15. A wheel assembly in accordance with claim 11, further comprising a second spring, for opposing in a second direction opposite from said first direction vertical motion of said damping mass.

16. A wheel assembly in accordance with claim 15, wherein said second spring exerts force to oppose motion or augment motion only in said second direction.

17. A wheel assembly in accordance with claim 15, wherein said damping mass assembly is a nonrotating section of said wheel, further comprising a first surface, mechanically coupled to said non-rotating section of said wheel;

a second surface, mechanically coupled to said damping mass, wherein said first spring exerts force by urging said first surface away from said second surface;

a third surface mechanically coupled to said non-rotating section of said wheel;

a fourth surface, mechanically coupled to said damping mass, wherein said second spring exerts force by urging said third surface away from said fourth surface;

wherein said damping mass positioning assembly is constructed and arranged so that a condition in which said first spring contacts both said first surface and said second surface and a condition in which said second spring contacts both said third surface and said fourth surface are mutually exclusive.

18. A wheel assembly in accordance with claim 11, wherein said first spring is mounted co-linearly with said shaft.

* * * * *